United States Patent
Irkliy et al.

(10) Patent No.: US 11,442,454 B2
(45) Date of Patent: Sep. 13, 2022

(54) ADAPTIVE SENSOR ARRAY SYSTEM AND METHOD

(71) Applicant: SHARKNINJA OPERATING LLC, Needham, MA (US)

(72) Inventors: Alex Irkliy, Needham, MA (US); Charles Fiebig, Needham, MA (US); Isaku D. Kamada, Brighton, MA (US); Xavier F. Cullere, Newton, MA (US); Charles S. Brunner, Stockton, NJ (US); Brian Burke, Mahwah, NJ (US)

(73) Assignee: SharkNinja Operating LLC, Needham, MA (US)

( * ) Notice: Subject to any disclaimer, the term of this patent is extended or adjusted under 35 U.S.C. 154(b) by 88 days.

(21) Appl. No.: 16/825,406

(22) Filed: Mar. 20, 2020

(65) Prior Publication Data

US 2020/0301430 A1 Sep. 24, 2020

Related U.S. Application Data

(60) Provisional application No. 62/821,833, filed on Mar. 21, 2019.

(51) Int. Cl.
*G05D 1/02* (2020.01)
*G01C 21/20* (2006.01)
(Continued)

(52) U.S. Cl.
CPC ......... *G05D 1/0212* (2013.01); *G01C 21/206* (2013.01); *G01S 17/04* (2020.01); *G01S 17/93* (2013.01); *G05D 2201/0215* (2013.01)

(58) Field of Classification Search
None
See application file for complete search history.

(56) References Cited

U.S. PATENT DOCUMENTS

| 4,119,900 A | 10/1978 | Kremnitz |
|---|---|---|
| 6,023,814 A | 2/2000 | Imamura |

(Continued)

FOREIGN PATENT DOCUMENTS

| CN | 109219785 A | 1/2019 |
|---|---|---|
| GB | 2344650 | 6/2000 |

(Continued)

OTHER PUBLICATIONS

PCT Search Report and Written Opinion dated Jun. 16, 2020, received in PCT Application No. PCT/US20/23892, 14 pgs.

(Continued)

*Primary Examiner* — David P. Merlino
(74) *Attorney, Agent, or Firm* — Grossman Tucker Perreault & Pfleger, PLLC

(57) ABSTRACT

An adaptive sensor array system and method includes receiving one or more signals from a sensor array and compare the received signals to one or more object detection threshold values, determining if the robotic cleaner was moving along a travel path for a predetermined period of time, window W, in response to a determination that the robotic cleaner was operating in straight-line motion during the window W, calculating a value of the received detected signals from the sensor array during one or more calibration periods C of the window W, and adjusting one or more of the object detection threshold values based on the calculated value during the window W. A sum of all the calibration periods C during window W is less than a length of the window W. One of the calibration periods C may start at a beginning of the window W.

30 Claims, 9 Drawing Sheets

(51) Int. Cl.
*G01S 17/93* (2020.01)
*G01S 17/04* (2020.01)

(56) References Cited

U.S. PATENT DOCUMENTS

| | | | |
|---|---|---|---|
| 6,407,696 B1 * | 6/2002 | Neben | G01S 7/4021 |
| | | | 342/70 |
| 6,433,329 B1 | 8/2002 | Butka et al. | |
| 6,703,599 B1 | 3/2004 | Casebolt et al. | |
| 7,002,550 B2 | 2/2006 | Casebolt et al. | |
| 7,133,745 B2 | 11/2006 | Wang | |
| 7,526,398 B1 | 4/2009 | Choi et al. | |
| 7,884,733 B2 | 2/2011 | O'Dowd et al. | |
| 8,009,930 B2 | 8/2011 | Li et al. | |
| 8,030,914 B2 | 10/2011 | Alameh et al. | |
| 8,050,876 B2 | 11/2011 | Feen et al. | |
| 8,271,133 B2 | 9/2012 | Park et al. | |
| 8,412,377 B2 | 4/2013 | Casey et al. | |
| 8,634,959 B2 | 1/2014 | Lee et al. | |
| 8,800,101 B2 | 8/2014 | Kim et al. | |
| 8,873,832 B2 | 10/2014 | Shin et al. | |
| 9,063,010 B2 | 6/2015 | Wu | |
| 9,222,801 B2 | 12/2015 | Kim et al. | |
| 9,223,440 B2 | 12/2015 | Lim et al. | |
| 9,247,171 B2 | 1/2016 | Ebisumoto et al. | |
| 9,287,864 B2 | 3/2016 | Buttolo et al. | |
| 9,337,832 B2 | 5/2016 | Buttolo et al. | |
| 9,440,652 B1 | 9/2016 | Ferguson et al. | |
| 2008/0236241 A1 | 10/2008 | Ino | |
| 2009/0045766 A1 | 2/2009 | Casey et al. | |
| 2009/0133467 A1 * | 5/2009 | Mori | G01C 19/00 |
| | | | 73/1.77 |
| 2009/0262760 A1 * | 10/2009 | Krupkin | G01S 7/484 |
| | | | 372/6 |
| 2013/0025085 A1 * | 1/2013 | Kim | A47L 9/2857 |
| | | | 15/319 |
| 2014/0289991 A1 | 10/2014 | Landy et al. | |
| 2016/0113469 A1 | 4/2016 | Schnittman et al. | |
| 2016/0220089 A1 | 8/2016 | Peukert et al. | |
| 2016/0252366 A1 | 9/2016 | Park et al. | |
| 2017/0029022 A1 * | 2/2017 | Nakamura | B62D 6/10 |
| 2020/0200566 A1 * | 6/2020 | Kim | G01C 21/32 |

FOREIGN PATENT DOCUMENTS

| | | |
|---|---|---|
| WO | 2017206179 | 12/2017 |
| WO | 2018040607 | 3/2018 |

OTHER PUBLICATIONS

Chinese Decision of Rejection with English translation dated Feb. 9, 2022, received in Chinese Patent Application No. 202120492989.8, 3 pages.

Chinese Office Action with English translation dated Mar. 9, 2022, received in Chinese Patent Application No. 202080022631.7, 11 pages.

* cited by examiner

ADAPTIVE SENSOR ARRAY SYSTEM AND METHOD

CROSS REFERENCE TO RELATED APPLICATIONS

The present application claims the benefit of U.S. Provisional Patent Application Ser. No. 62/821,833 filed Mar. 21, 2019, which is fully incorporated herein by reference.

TECHNICAL FIELD

The present disclosure is generally directed to surface treatment apparatuses and more specifically to a robotic cleaner having an adaptive sensor array system and method.

BACKGROUND INFORMATION

Surface treatment apparatuses can include robotic cleaners. Some robotic cleaners are configured to autonomously travel about a surface while collecting debris left on the surface. The robotic cleaner can be configured to travel along a surface according to a random and/or predetermined path. When traveling along a surface according the random and/or predetermined path, the robotic cleaner may adjust its travel path in response to encountering one or more obstacles. When traveling along a surface according to a predetermined path, the robotic cleaner may have, in prior operations, developed a map of the area to be cleaned and travel about the area according to a predetermined path based on the map. Regardless of whether the robotic cleaner is configured to travel according to a random or predetermined path, the robotic cleaner may be configured to travel in predetermined patterns. For example, a robotic cleaner may be positioned in a location of increased debris and be caused to enter a cleaning pattern that causes the robotic cleaner to remain in the location of increased debris for a predetermined time.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner (e.g., a robotic vacuum cleaner) including an adaptive sensor array system and method. The robotic cleaner may include a sensor array and a sensor array controller. The sensor array controller is configured to receive signal(s) from the sensor array and compare the received signals to one or more object detection threshold values. According to one embodiment, the sensor array controller includes an adaptive sensor array algorithm is configured to determine/detect whether the robotic cleaner was moving along a travel path (i.e., no bump detection and/or turns) for a predetermined period of time, window W. If so, the sensor array controller is configured to calculate a value of the detected signal(s) from the sensor array during one or more calibration periods C of the window W. A sum of all the calibration periods C is less than the length of the window W. One of the calibration periods C may start at the beginning of the window W. The sensor array controller is further configured to adjust one or more of the object detection threshold values based on the calculated value during the window W (e.g., calibration period(s) C). Optionally, the sensor array controller is configured to determine whether detected values from the sensor array meet and/or exceed one or more object detection thresholds for greater than or equal to a predetermined amount of time $T_{false}$. If so, the sensor array controller may assume that the sensor array is causing a false trigger condition and may cause the robotic cleaner to engage forward motion, and may adjust one or more of the object detection thresholds as previously described.

Figure 1:
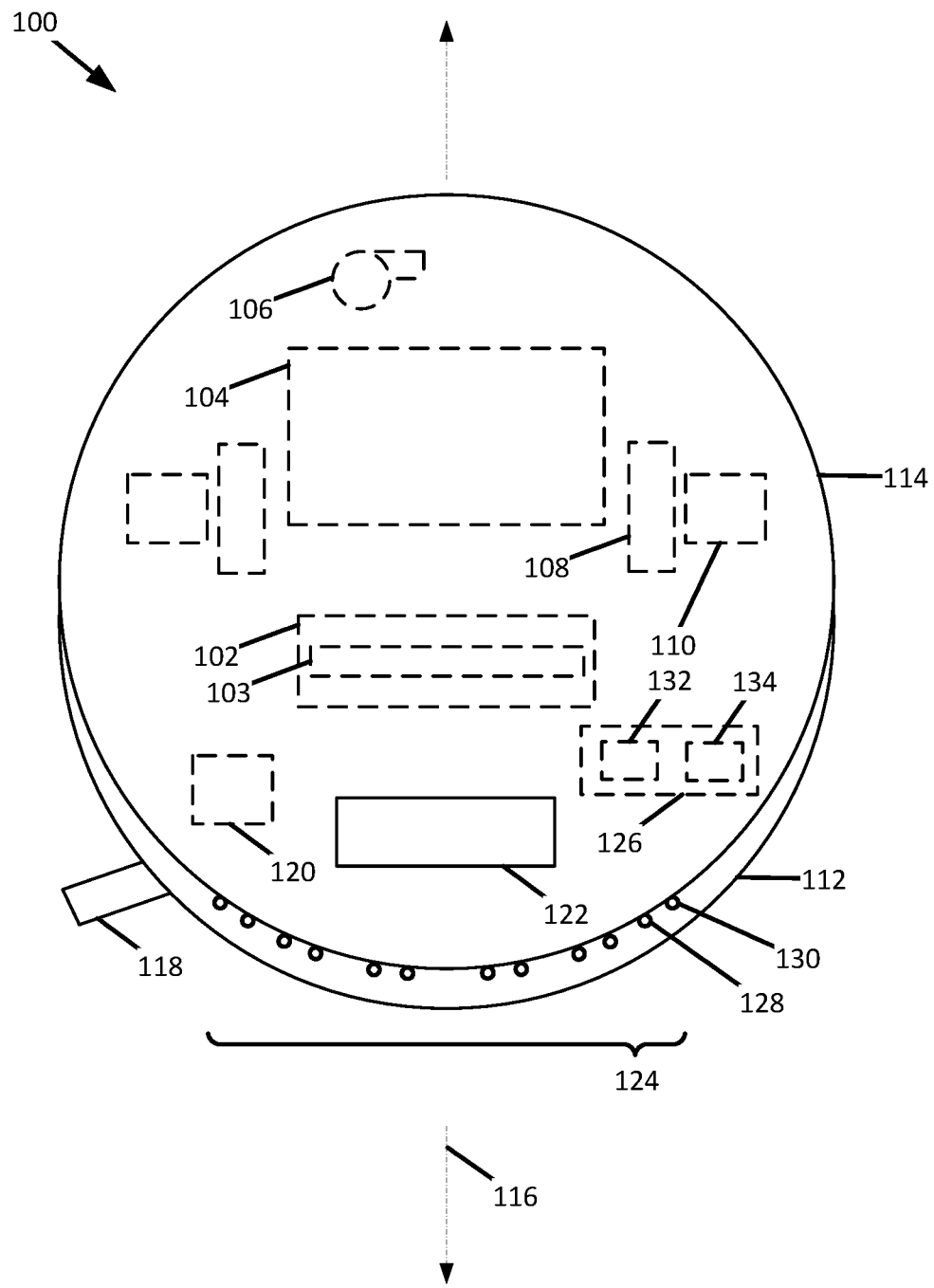
FIG. 1 is a schematic view of an example of a robotic vacuum cleaner, consistent with embodiments of the present disclosure.

FIG. 1 shows a schematic view of an example of a robotic vacuum cleaner 100. As shown, the robotic vacuum cleaner 100 includes an air inlet 102 fluidly coupled to a dust cup 104 and a suction motor 106. The suction motor 106 causes debris to be suctioned into the air inlet 102 and deposited into the dust cup 104 for later disposal. The robotic vacuum cleaner 100 may optionally include one or more agitators 103 at least partially disposed within the air inlet 102. The agitator 103 may be driven by one or more motors disposed within the robotic vacuum cleaner 100 such that the agitator 103 rotates about a longitudinal pivot axis. By way of a non-limiting example, the agitator 103 may include a rotatable bush bar having a plurality of bristles.

As also shown, the robotic vacuum cleaner 100 includes a plurality of wheels 108 coupled to a respective drive motor 110. As such, each wheel 108 may generally be described as being independently driven. The robotic vacuum cleaner 100 can be steered by adjusting the rotational speed of one of the plurality of wheels 108 relative to the other of the plurality of wheels 108.

One or more side brushes 118 can be positioned such that a portion of the side brush 118 extends at least to (e.g., beyond) the perimeter defined by a housing 114 of the robotic vacuum cleaner 100. The side brush 118 can be configured to urge debris in a direction of the air inlet 102 such that debris located beyond the perimeter of the housing 114 can be collected. For example, the side brush 118 can be configured to rotate in response to activation of a side brush motor 120.

A user interface 122 can be provided to allow a user to control the robotic vacuum cleaner 100. For example, the user interface 122 may include one or more push buttons that correspond to one or more features of the robotic vacuum cleaner 100.

One or more displaceable bumpers 112 can be disposed along a portion of the perimeter defined by a housing 114 of the robotic vacuum cleaner 100. The displaceable bumper 112 is configured to transition between an unactuated position and an actuated position in response to engaging, for example, an obstacle. The displaceable bumper 112 can be configured to be moveable along a first axis 116 extending generally parallel to a top surface of the housing 114. As such, the displaceable bumper 112 is displaced in response to engaging (e.g., contacting) at least a portion of an obstacle disposed on and extending from a surface to be cleaned. Additionally, or alternatively, the displaceable bumper 112 can be configured to be moveable along a second axis that extends transverse to (e.g., perpendicular to) the first axis 116. As such, the displaceable bumper 112 is displaced in response to engaging (e.g., contacting) at least a portion of an obstacle that is spaced apart from the surface to be cleaned. Therefore, the robotic vacuum cleaner 100 may avoid becoming trapped between the obstacle and the surface to be cleaned. While a single displaceable bumper 112 is shown generally in forward half of the robotic vacuum cleaner 100, it should be appreciated that one or more displaceable bumpers 112 may be located anywhere on the robotic vacuum cleaner 100.

The robotic vacuum cleaner 100 may also include one or more sensor arrays 124 and one or more sensor array controllers 126. The sensor array 124 may include a plurality of optical and/or acoustic sensors including emitter sensors 128 and detector sensors 130. For example, the sensor array 124 may include a plurality of infrared emitters and infrared detectors. At least a portion of the emitter sensors 128 and/or detector sensors 130 may be disposed between the displaceable bumper 112 and the housing 114. As such, at least some of the signals transmitted by the emitter sensors 128 and/or the reflected signals received by the detector sensor 130 may pass through a portion of the displaceable bumper 112. While the sensor array 124 is shown generally in forward half of the robotic vacuum cleaner 100, it should be appreciated that sensor arrays 124 may be located anywhere on the robotic vacuum cleaner 100 (e.g., the side and/or the back).

In operation, the emitter sensors 128 are configured to transmit detection signals into the environment around the robotic vacuum cleaner 100 (e.g., but not limited to, in front of and/or to the left, to the right, and/or to the back of the robotic vacuum cleaner 100). At least a portion of the detection signals are reflected back towards the detector sensors 130. The detector sensors 130 receive the reflected signals and transmit a signal to the sensor array controller 126. The sensor array controller 126 may include computer readable memory 132 and circuitry 134 (e.g., but not limited to, one or more processors, integrated controllers, or the like) configured to perform object detection. In at least one embodiment, the circuitry 134 may be configured to compare the signal(s) from the sensor arrays 124 (e.g., the detector sensors 130) to one or more threshold values stored in the memory 134. For example, the threshold values may include a far object detection threshold and/or a near object detection threshold. The far object detection threshold may correspond to value which is lower than the near object detection threshold. By way of a non-limiting example, the far object detection threshold may by 150% of the no-object detection signal transmitted by the sensor array 124 (i.e., the value of the signal from the sensor array 124 when no object is within the detection field of the sensor array 124) and the near object detection threshold may by 300% of the no-object detection signal. Of course, these values are merely exemplary values, and that other values and/or other thresholds may be used.

While the sensor array 124 and sensor array controller 126 is generally effective, debris may accumulate on displaceable bumper 112 and/or the sensor array 124 which may impact the signal strength of transmitted and/or reflected signal over time. For example, in some instances debris may build up on the displaceable bumper 112 and/or the sensor array 124 that may decrease the signal strength of transmitted and/or reflected signal over time. In addition, the debris may be removed from the displaceable bumper 112 and/or the sensor array 124 (e.g., a user may wipe the displaceable bumper 112 and/or the sensor array 124) which may cause the signal strength of transmitted and/or reflected signal to suddenly increase. The sensor array controller 126 according to at least one embodiment consistent with the present disclosure may therefore include an adaptive sensor array algorithm for adjusting one or more of the threshold values stored in the memory 132.

Figure 2:
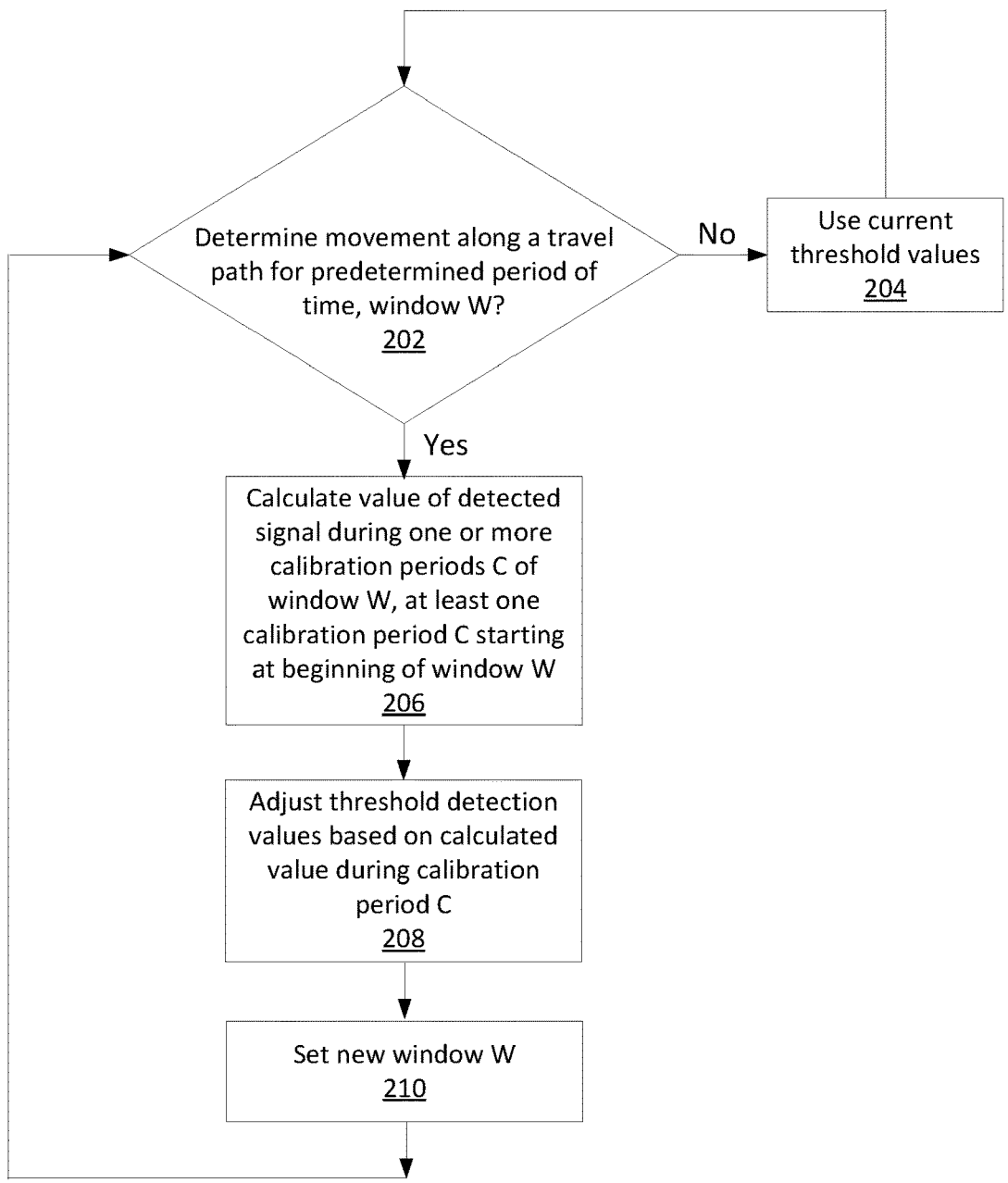
FIG. 2 is a flow chart of one example of an adaptive sensor array algorithm, consistent with embodiments of the present disclosure.

Turning now to FIG. 2, one embodiment of an adaptive sensor array algorithm 200 executed/performed by the sensor array controller 126 is generally illustrated. The sensor array controller 126 may begin by determining/detecting movement of the of the robot vacuum cleaner 100 along a travel path for a predetermined period of time, operation 202. For example, the sensor array controller 126 may determine whether the robot vacuum cleaner 100 has moved along a travel path during a window W of a predetermined amount of time. A travel path is defined as motion of the robot vacuum cleaner 100 during which the robot vacuum cleaner 100 does not detect an event that causes/triggers the robot vacuum cleaner 100 to change its course/direction. One example of a travel path may include substantially linear movement. Substantially linear movement is defined as movement along a heading which does not vary by more than 10%. Another example of a travel path may include curvilinear and/or arcuate movement. Further non-limiting examples of travel paths may include a zig-zag pattern, a spiral pattern, or the like. Non-limiting examples of events that can trigger change in course/direction include detection/determination of a bump (e.g., a bump caused by activation of the displaceable bumpers 112), detection/determination of values from the sensor array 124 which meet and/or exceed one or more threshold value(s), cliff detection, and/or detection/determination that the robot vacuum cleaner 100 is travelling too long (e.g., time and/or distance) in one direction.

The window W of predetermined amount of time may be selected in order balance computational requirements of the sensor array controller 126 and sensitivity requirements. According to one embodiment, the window W may be four seconds long. It should be appreciated, however, that the window W may be longer or shorter than four seconds. For example, the window W may be between 1 second and 20 seconds long, e.g., between 2 seconds and 15 seconds long, 3 seconds and 10 seconds, and/or any range or value therein. It should also be appreciated that the length of window W may be adjustable (e.g., dynamically adjustable). For example, the length of the window W may be adjusted based on the size of the room that the robot vacuum cleaner 100 is operating, the number of detected obstacles, the amount of debris collected, the remaining battery life, how close the robot vacuum cleaner 100 is to a charging/docking station, or the like.

If the sensor array controller 126 detects/determines an event that causes/triggers the robot vacuum cleaner 100 to change its course/direction during window W (e.g., No at operation 202), then the sensor array controller 126 continues to use the current threshold value(s), operation 204, and reverts back to detecting movement along a travel path during a new window W, operation 202. The new window W may begin at some point after (e.g., immediately after or some predetermined amount of time after) the last event that causes/triggers the robot vacuum cleaner 100 to turn.

If the sensor array controller 126 does not detect an event that causes/triggers the robot vacuum cleaner 100 to change its course/direction during window W (e.g., Yes at operation 202), then the sensor array controller 126 calculates a value of the detected signal from the sensor array 124 during one or more calibration periods C, operation 206. The one or more calibration periods C collectively amount to only a portion of the active (e.g., current) window W, i.e., the combined amount of time for all the calibration periods C during an active window W is less than the length of the active window W. For exemplary purposes, an active window W may begin at time $T_0$ and end at time $T_{end}$, and collectively the total amount of the calibration periods C is less than $T_{end}-T_0$.

The calculated value of the detected signal from the sensor array 124 may be determined based on one or more factors. By way of non-limiting examples, the sensor array controller 126 may calculate the value of the detected signal based on an average of the detected signals during the active window W, a maximum/peak value of the detected signal during the active window W, a minimum value of the detected signal during the active window W, a median value of the detected signal during the active window W, a weighted value of the detected signal during the active window W, the last value of the detected signal during the active window W, the first value of the detected signal during the active window W, eliminating outliers (errors in the dataset), and/or the like.

Figure 3:
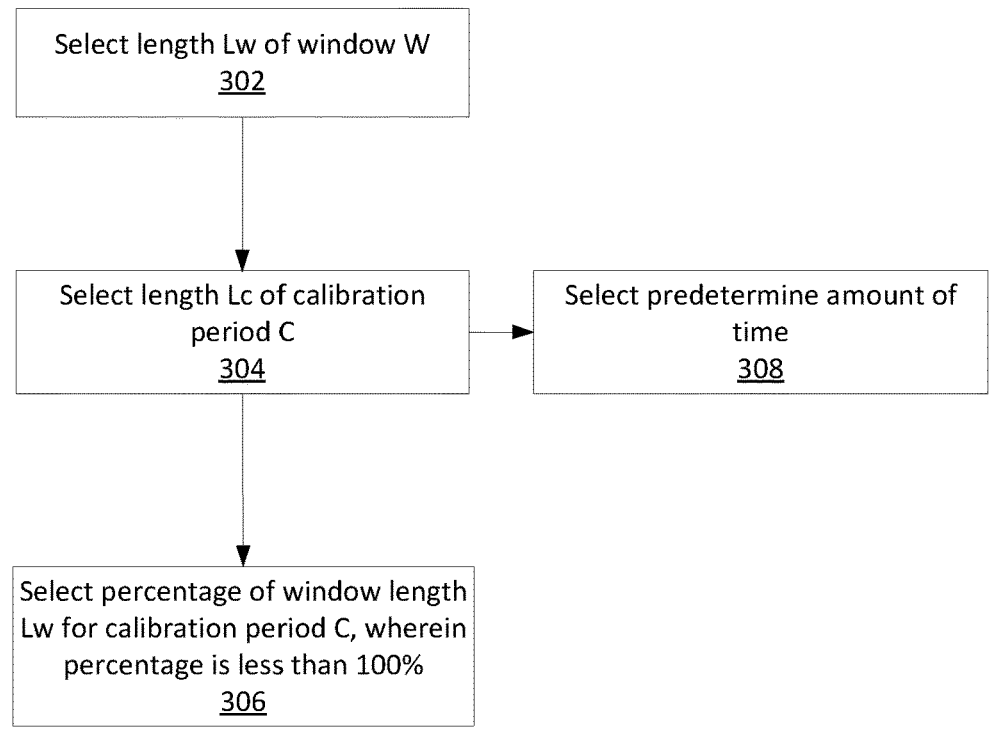
FIG. 3 is a flow chart of one example of an algorithm for determining the calibration period, consistent with embodiments of the present disclosure.

Referring to FIG. 3, one embodiment of the algorithm 300 for determining the calibration period C is generally illustrated. The algorithm 300 includes selecting a length Lw of an active window W, operation 302. The length Lw of an active window W may be selected, at least in part, in order to balance computational requirements and sensitivity requirements of the sensor array controller 126. According to one embodiment, the length Lw of an active window W may be static. Alternatively (or in addition), the length Lw of an active window W may be adjustable (e.g., dynamically adjustable). For example, the Lw of an active window W may be adjusted based on, at least in part, the size of the room that the robot vacuum cleaner 100 is operating, the number of detected obstacles, the amount of debris collected, the remaining battery life, how close the robot vacuum cleaner 100 is to a charging/docking station, or the like.

Next, the length Lc of the calibration period C is selected, operation 304. The length Lc of the calibration period C may be selected based on, at least in part, on a percentage of the length Lw of an active window W, operation 306. For example, the length Lc of the calibration period C may be determined based, at least in part, on the equation Lc=Lw/n, where n is greater than 1. By way of non-limiting examples, the total length Lc of the calibration periods C may be greater than 5% and less than or equal to 90% of the length Lw of an active window W, e.g., greater than 5% and less than or equal to 80% of the length Lw of an active window W, greater than 5% and less than or equal to 60% of the length Lw of an active window W, greater than 5% and less than or equal to 50% of the length Lw of an active window W, greater than 5% and less than or equal to 40% of the length Lw of an active window W, greater than 5% and less than or equal to 30% of the length Lw of an active window W, and/or any range or value therein. Alternatively, length Lc of the calibration period C may be a set amount of time, operation 308. For example, the set amount of time may be selected to long enough to provide sufficient data for determining a calculated value of the detected signal from the sensor array 124 which is representative of the actual detected signals. To this end, the set amount of time may be selected to be large enough minimize and/or eliminate outlying signal values (e.g., temporary spikes and/or drops) while also providing a sufficient amount of data to determine an accurate and/or representative value of the data set.

Figure 4A:
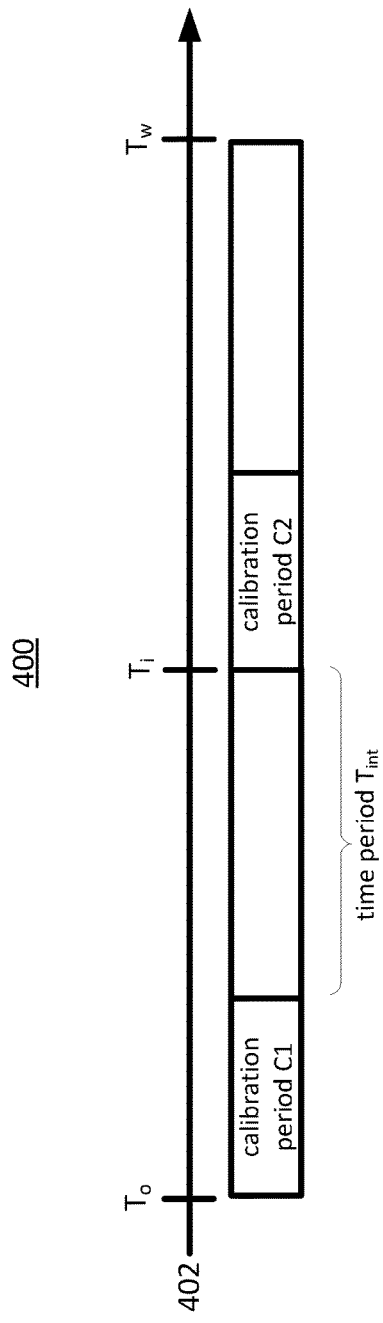
FIG. 4A generally illustrates one example of a window having multiple calibration periods, consistent with embodiments of the present disclosure.

As noted herein, one or more calibration periods C collectively amount to only a portion of the active (e.g., current) window W, i.e., the combined amount of time for all the calibration periods C during an active window W is less than the length of the active window W. One example 400 of an active window W that includes a plurality of calibration periods C1, C2 is generally illustrated in FIG. 4A. As can be seen, time is represented by the horizontal line 402, and the active window W starts at time $T_0$ and ends at time $T_w$. The total amount of time or length Lw of the active window W is therefore equal to $T_{end}-T_0$. The first calibration period C1 starts at the beginning of the active window W, i.e., time $T_0$, while the subsequent (e.g., second) calibration periods C2 start at time $T_i$ some intermediate time period $T_{int}$ after the end of the preceding calibration period C1. The last or final calibration period C during the active window W may end prior to or at the end of the active window W, i.e., time $T_{end}$. The total amount of time of the calibration periods C is less than total amount of time or length Lw of the active window W.

Figure 4B:
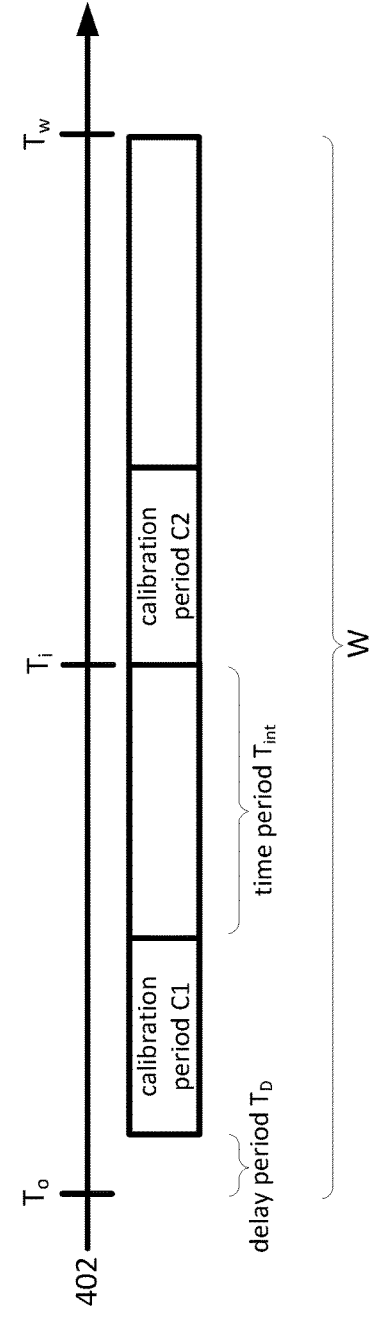
FIG. 4B generally illustrates another example of a window having multiple calibration periods, consistent with embodiments of the present disclosure.

It should be appreciated that while one of the calibration periods (e.g., C1) is illustrating as starting at the beginning of the active window W (e.g., $T_0$), this is not a limitation of the present disclosure unless specifically claimed as such. For example, one or more of the calibration periods C (e.g., C1 and/or C2) may start after a delay period $T_D$ as generally illustrated in FIG. 4B after the beginning of the active window W (e.g., $T_0$). The delay period $T_D$ may include a predetermined amount to time (e.g., a set amount of time) and/or a variable amount of time. For exemplary purposes, an active window W may begin at time $T_0$ and end at time $T_{end}$, and the first calibration period C1 may begin at time $T_0+T_D$, and collectively the total amount of the calibration periods C is less than $T_{end}-T_0$.

Referring back to FIG. 2, after the value of the detected signal during the calibration period(s) C is calculated, one or more of the threshold detection values stored in the memory 132 of the sensor array controller 126 is adjusted based, at least in part, on the calculated value during the calibration period(s) C, operation 208. According to one embodiment, one or more of the thresholds may be based on a fixed percentage of the calculated value during the calibration period(s) C. For example, a far detection threshold value may be adjusted to be 150% of calculated value during the calibration period(s) C and the near object detection threshold may be adjusted to be 300% of the calculated value during the calibration period(s) C. Of course, it should be understood that these values are merely exemplary values, and that other values and/or other thresholds may be used. According to another embodiment, one or more of the detection threshold values may be determined based on a linear or non-linear formula. For example, one or more of the detection threshold values may be determined based on a formula that takes into account the amount of change in the calculated value during the calibration period(s) C compared to the previous window W and/or threshold value(s).

After the threshold detection values have been adjusted, a new window is set, operation 210. After the new window has been set, the algorithm may revert back to operation 202, and the algorithm may repeat. With reference to FIGS. 5-8, various embodiments of algorithms illustrating how a new window may be set are generally illustrated. While the first calibration period C1 is illustrating starting at time $T_0$ in FIGS. 5-8, it should be appreciated that any one of the first windows does not have to start at time $T_0$ and instead may begin at time $T_0+T_D$.

Figure 5:
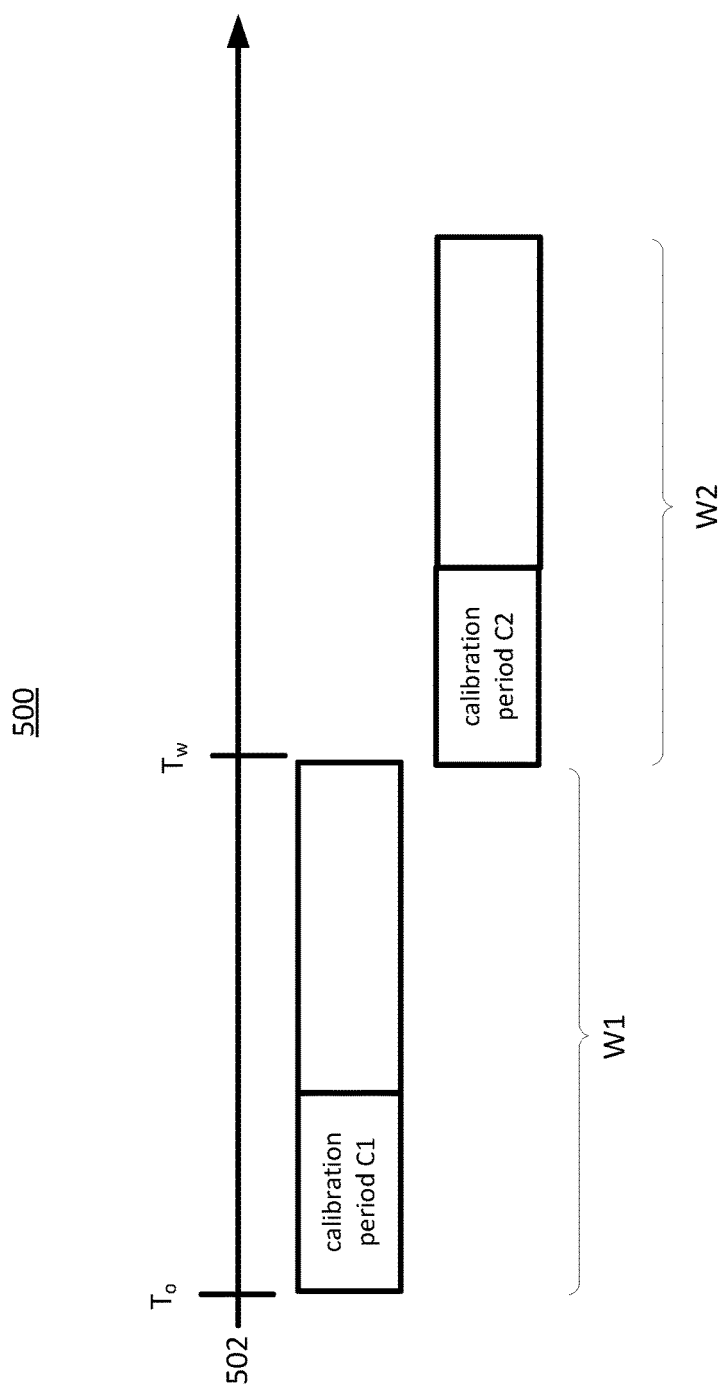
FIG. 5 generally illustrates one example of an algorithm for how a new window is set, consistent with embodiments of the present disclosure.

In particular, one algorithm 500 generally illustrating how a new window may be set is shown in FIG. 5 in which time is represented by the horizontal line 502. A first (e.g., previous) window W1 starts at time $T_0$ and ends at time $T_w$, and the first calibration period T1 starts at the beginning of the first window W1, i.e., time $T_0$. A subsequent (i.e., new) window W2 begins at the end of the previous window W1, i.e., time $T_w$, and the second calibration period T2 starts at the beginning of the second window W2, i.e., time $T_w$.

Figure 6:
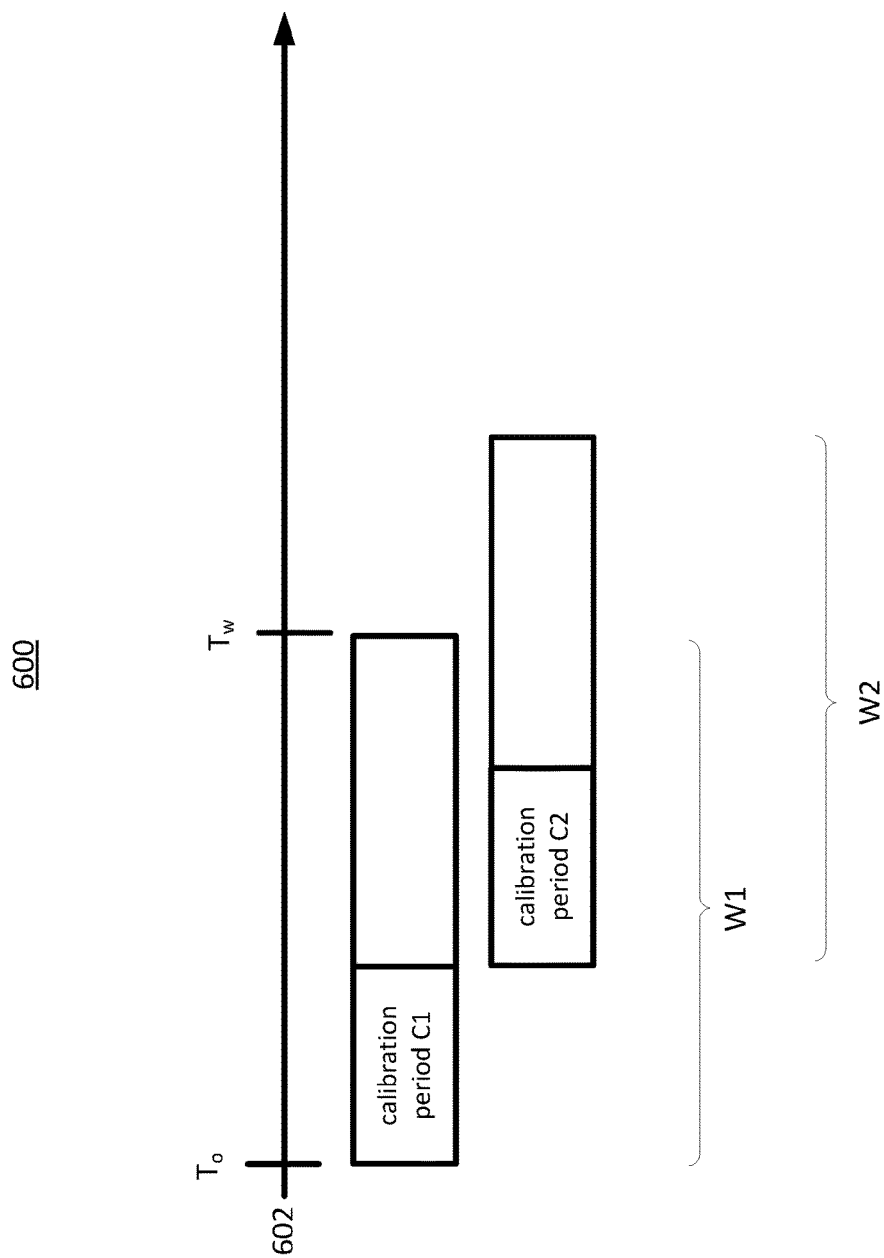
FIG. 6 generally illustrates another example of an algorithm for how a new window is set, consistent with embodiments of the present disclosure.

Another embodiment algorithm 600 generally illustrating how a new window may be set is shown in FIG. 6 in which time is represented by the horizontal line 602. A first (e.g., previous) window W1 starts at time $T_0$ and ends at time $T_w$, and the first calibration period C1 starts at the beginning of the first window W1, i.e., time $T_0$. A subsequent (i.e., new) window W2 begins at the end of the first calibration period C1, and the second calibration period C2 starts at the end of the first calibration period T1.

Figure 7:
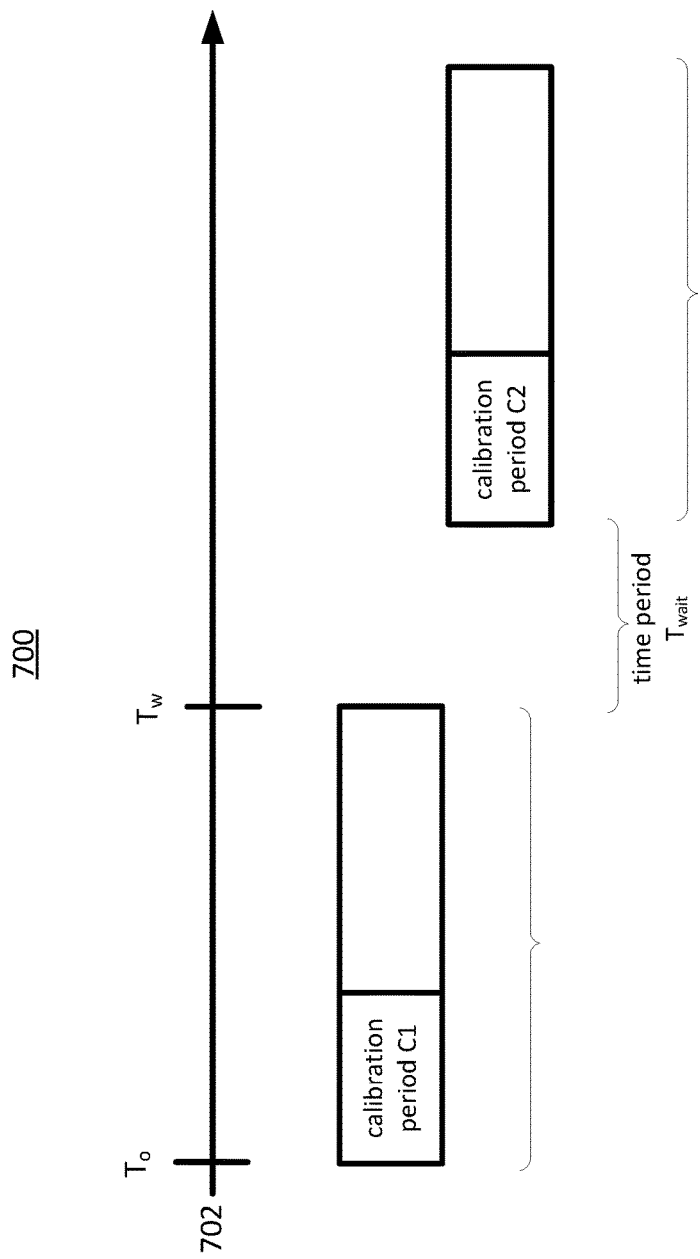
FIG. 7 generally illustrates a further example of an algorithm for how a new window is set, consistent with embodiments of the present disclosure.
Figure 8:
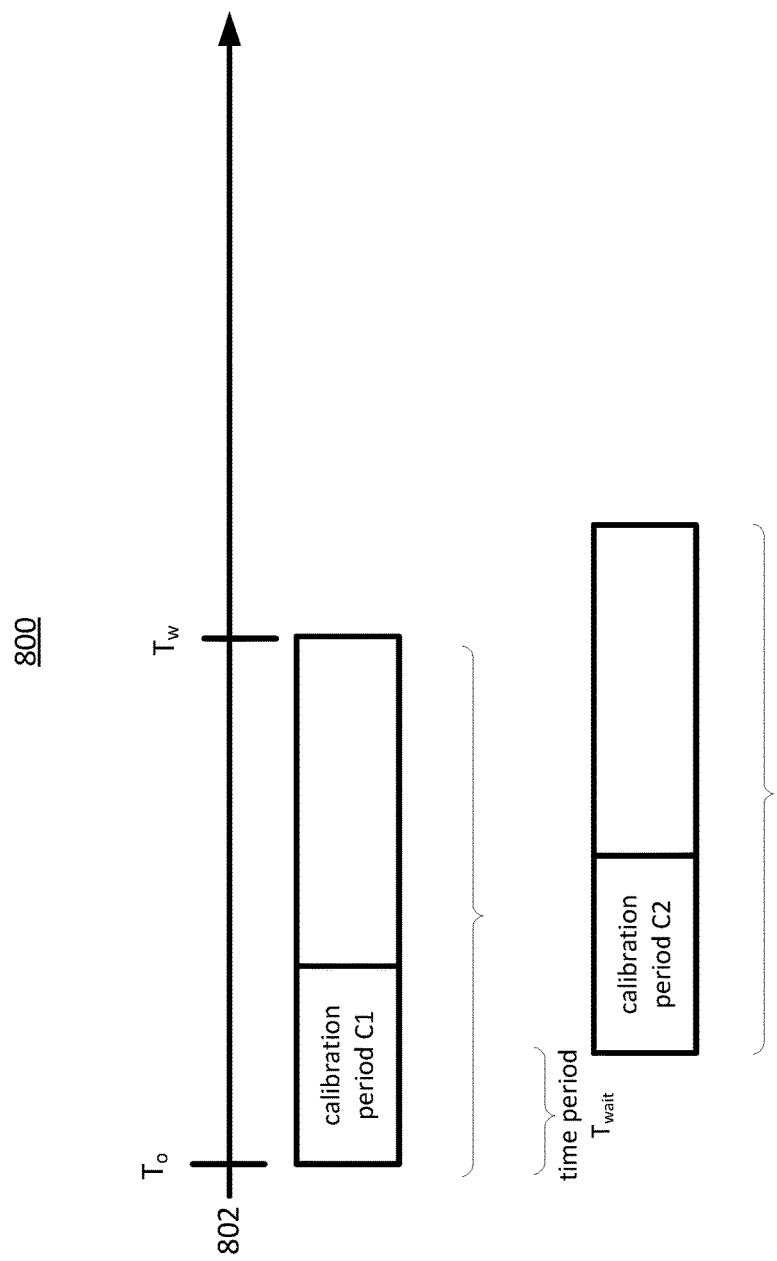
FIG. 8 generally illustrates yet another example of an algorithm for how a new window is set, consistent with embodiments of the present disclosure.

Yet another embodiment algorithm 700 generally illustrating how a new window may be set is shown in FIG. 7 in which time is represented by the horizontal line 702. A first (e.g., previous) window W1 starts at time $T_0$ and ends at time $T_w$, and the first calibration period C1 starts at the beginning of the first window W1, i.e., time $T_0$. A subsequent (i.e., new) window W2 begins a predetermined amount of time $T_{wait}$ after the end of the previous (e.g., first) window W1, and the second calibration period C2 starts at the beginning of the subsequent (e.g., second) window W2. Similarly, FIG. 8 generally illustrates a further embodiment of an algorithm 800 showing how to set a new window in which time is represented by the horizontal line 802. A first (e.g., previous) window W1 starts at time $T_0$ and ends at time $T_w$, and the first calibration period C1 starts at the beginning of the first window W1, i.e., time $T_0$. A subsequent (i.e., new) window W2 begins a predetermined amount of time $T_{wait}$ after the beginning of the previous (e.g., first) window W1, and the second calibration period C2 starts at the beginning of the subsequent (e.g., second) window W2. In both embodiments, the predetermined amount of time $T_{wait}$ may be fixed and/or adjustable based on any of the factors described herein.

Figure 9:
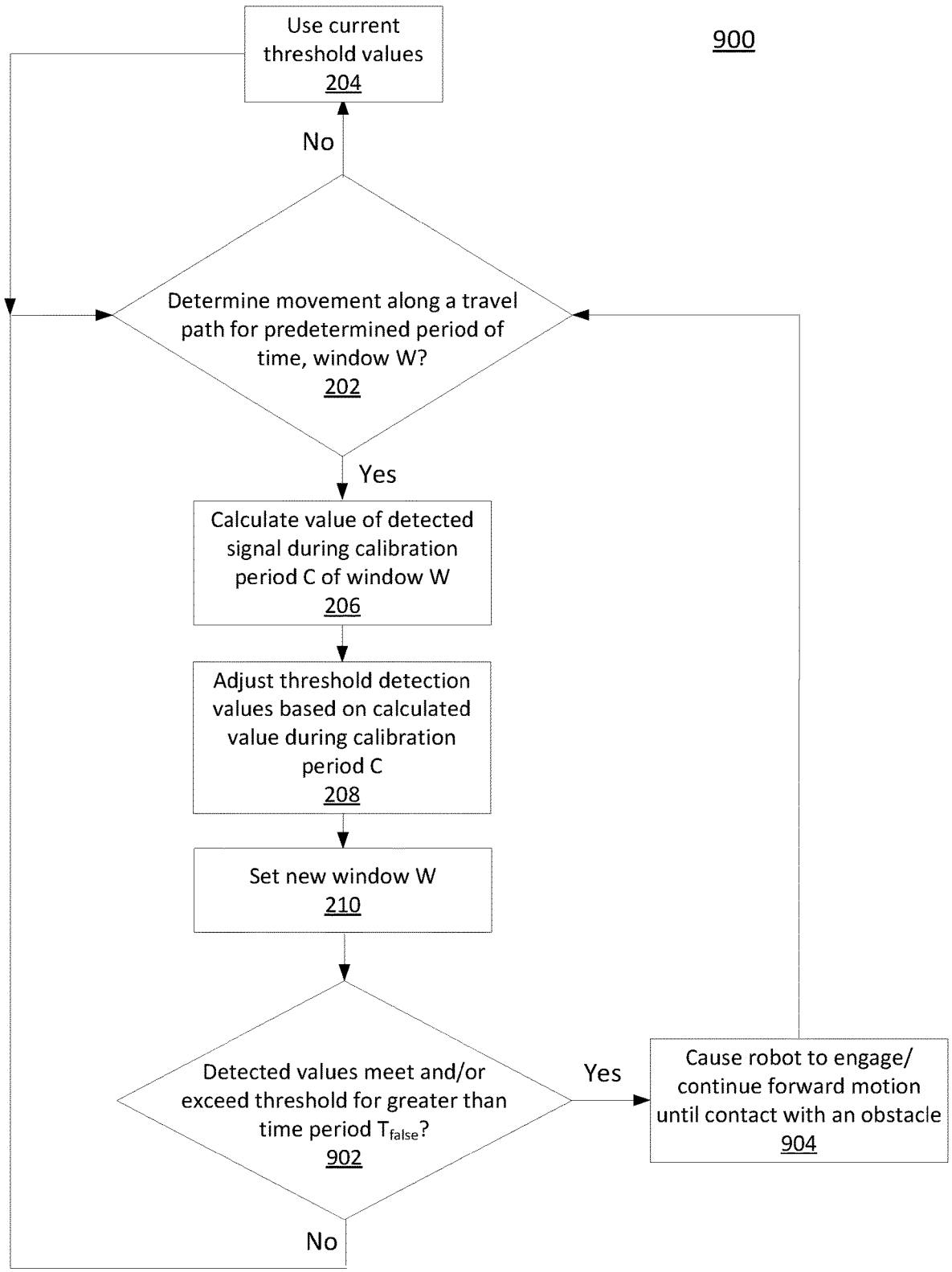
FIG. 9 is a flow chart of another example of an adaptive sensor array algorithm, consistent with embodiments of the present disclosure.

Turning now to FIG. 9, a further embodiment of an adaptive sensor array algorithm 900 executed/performed by the sensor array controller 126 is generally illustrated. Operations of algorithm 900 that are similar to adaptive sensor array algorithm 200 described herein will not be repeated. Rather than reverting back to operation 202 after operation 210, the adaptive sensor array algorithm 900 may determine whether the detected values from the sensor array 124 meet and/or exceed one or more object detection thresholds for greater than or equal to a predetermined amount of time $T_{false}$, operation 902. For example, the adaptive sensor array algorithm 900 may determine whether the detected values from the sensor array 124 meets and/or exceeds a far object detection threshold for greater than or equal to a predetermined amount of time $T_{false}$, but does not meet and/or exceed a near object detection threshold and/or sense a bump (e.g., a bump caused by activation of the displaceable bumpers 112).

In the event that the detected values from the sensor array 124 do not meet and/or exceed one or more object detection thresholds for greater than or equal to a predetermined amount of time $T_{false}$ (e.g., No at operation 902), the algorithm 900 may revert back to operation 202, and the algorithm 900 may repeat. The time period $T_{false}$ may be selected to be greater than or equal to the length Lw of a plurality of windows W. For example, the time period $T_{false}$ may be selected based on an average speed of the robotic vacuum cleaner 100 and the maximum object detection distance of the sensor array 124 and/or the sensor array controller 126. For example, the time period $T_{false}$ may be selected such that the robotic vacuum cleaner 100 should have either triggered another object detection threshold and/or bumped into an object based on the robotic vacuum cleaner 100 and the maximum object detection distance of the sensor array 124 and/or the sensor array controller 126. Alternatively (or in addition), the time period $T_{false}$ may be a fixed amount of time and/or an adjustable (e.g., dynamically adjustable) amount of time. For example, the time period $T_{false}$ may be adjusted based on the size of the room that the robot vacuum cleaner 100 is operating, the number of detected obstacles, the amount of debris collected, the remaining battery life, how close the robot vacuum cleaner 100 is to a charging/docking station, or the like.

In the that the detected values from the sensor array 124 meet and/or exceed one or more object detection thresholds for greater than or equal to a predetermined amount of time $T_{false}$ (e.g., Yes at operation 902), the algorithm 900 (e.g., the sensor array controller 126) may assume that the sensor array 124 is causing a false trigger condition. A false trigger condition may be caused, for example, in the event that the sensor array 124 and/or the displaceable bumpers 112 have been suddenly cleaned, and the adaptive algorithm 200 had reduced the object detection thresholds. In the event of a false trigger condition, the algorithm 900 may cause the robot vacuum cleaner 100 to engage and/or continue forward motion, operation 904. For example, the algorithm 900 may set one or more of the object detection thresholds (e.g., but not limited to the far and/or near object detection thresholds) to a maximum value, an elevated value (e.g., a value greater than or equal to 80% of the maximum value, a value greater than or equal to 90% of the maximum value, and/or a value greater than or equal to 95% of the maximum value), disable one or more of the object detection thresholds, and/or ignore one or more of the object detection thresholds. After the forward motion is activated, the algorithm 900 may revert back to operation 202, and the algorithm 900 may repeat.

The controller 126 may be implemented as a processing device/circuit such as, for example, a field-programmable gate array (FPGA), Reduced Instruction Set Computer (RISC) processor, x86 instruction set processor, microcontroller, an application-specific integrated circuit (ASIC). The controller 126 may be configured to execute a plurality of instructions to carry out processes in accordance with various aspects and embodiments disclosed herein. For example, the controller 126 may be configured to execute the adaptive sensor array algorithm/process of FIGS. 2-9. The processes disclosed herein may be may be implemented, for example, using software (e.g., C or C++ executing on the controller 126), hardware (e.g., hardcoded gate level logic or purpose-built silicon) or firmware (e.g., embedded routines executing on a microcontroller), or any combination thereof.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A sensor array controller for a robotic cleaner comprising:
   circuitry configured to:
      receive one or more signals from a sensor array and compare said received signals to one or more object detection threshold values;
      determine if said robotic cleaner was moving along a travel path for a predetermined period of time, window W;
      in response to a determination that said robotic cleaner was moving along said travel path during said window W, calculate a value of said received signals from said sensor array during a plurality of calibration periods C of said window W, wherein a sum of all said calibration periods C during window W is less than a length of said window W; and
      adjust one or more of said object detection threshold values based on said calculated value during said window W.

2. The sensor array controller of claim 1, wherein in response to said determination that said robotic cleaner was not moving along said travel path during said window W, said sensor array controller is further configured to use one or more current object detection threshold values.

3. The sensor array controller of claim 1, wherein said value of said received signals from the sensor array during the plurality of calibration periods C of the window W is calculated based, at least in part, on an average of said received signals from said sensor array during the plurality of calibration periods C of said window W.

4. The sensor array controller of claim 1, wherein said robotic cleaner is determined to have been moving along said travel path during window W if said robotic cleaner does not detect a bump and does not initiate a turn.

5. The sensor array controller of claim 1, wherein said circuitry is further configured to:
   determine whether said received signals from said sensor array meet or exceed one or more of said object detection thresholds for greater than or equal to a predetermined amount of time $T_{false}$; and
   in response to a determination that said received signals from said sensor array meet or exceed one or more of said object detection thresholds for greater than or equal to a predetermined amount of time $T_{false}$, cause said robotic cleaner to engage forward motion.

6. The sensor array controller of claim 5, wherein said determining whether said received signals from said sensor array meet or exceed one or more of said object detection thresholds for greater than or equal to said predetermined amount of time $T_{false}$ comprises determining whether said received signals from said sensor array meet or exceed a far object detection threshold for greater than or equal to said predetermined amount of time $T_{false}$.

7. The sensor array controller of claim 5, wherein engaging forward motion comprises one or more of:
   setting one or more of the object detection thresholds to a maximum value;
   setting one or more of the object detection thresholds to an elevated value;
   disable one or more of the object detection thresholds; and/or
   ignoring one or more of the object detection thresholds.

8. The sensor array controller of claim 1, wherein at least one of said calibration periods C starts at a beginning of said window W.

9. The sensor array controller of claim 1, wherein said travel path comprises substantially linear movement.

10. The sensor array controller of claim 1, wherein said travel path comprises a curvilinear movement.

11. An adaptive sensor array for a robotic cleaner method comprising:
    receiving one or more signals from a sensor array and comparing said received signals to one or more object detection threshold values;
    determining if said robotic cleaner was moving along a travel path for a predetermined period of time, window W;
    in response to said determination that said robotic cleaner was moving along said travel path during said window W, calculating a value of said received signals from said sensor array during a plurality of calibration periods C of said window W, wherein a sum of all said calibration periods C during window W is less than a length of said window W; and
    adjusting one or more of said object detection threshold values based on said calculated value during said window W.

12. The method of claim 11, wherein in response to a determination that said robotic cleaner was not moving along said travel path during said window W, said method further comprises using one or more current object detection threshold values.

13. The method of claim 11, wherein said calculating said value of said received signals from the sensor array during the plurality of calibration periods C of the window W comprises calculating said value based, at least in part, on an average of said received signals from said sensor array during the plurality of calibration periods C of said window W.

14. The method of claim 11, determining said robotic cleaner was moving along said travel path during window W if said robotic cleaner does not detect a bump and does not initiate a turn.

15. The method of claim 11, further comprising:
    determining whether said received signals from said sensor array meet or exceed one or more of said object detection thresholds for greater than or equal to a predetermined amount of time $T_{false}$; and
    in response to said determining that said received signals from said sensor array meet or exceed one or more of said object detection thresholds for greater than or equal to a predetermined amount of time $T_{false}$, causing said robotic cleaner to engage forward motion.

16. The method of claim 15, wherein said determining whether said received signals from said sensor array meet or exceed one or more of said object detection thresholds for greater than or equal to said predetermined amount of time $T_{false}$ comprises determining whether said received signals from said sensor array meet or exceed a far object detection threshold for greater than or equal to said predetermined amount of time $T_{false}$.

17. The method of claim 15, wherein engaging forward motion comprises one or more of:
   setting one or more of the object detection thresholds to a maximum value;
   setting one or more of the object detection thresholds to an elevated value;
   disable one or more of the object detection thresholds; and/or
   ignoring one or more of the object detection thresholds.

18. The method of claim 11, wherein at least one of said calibration periods C starts at a beginning of said window W.

19. The method of claim 11, wherein said travel path comprises substantially linear movement.

20. The method of claim 11, wherein said travel path comprises a curvilinear movement.

21. One or more non-transitory computer readable memories which store, in combination or singularly, instructions that, when executed by one or more processors, cause of the following operations:
   receiving one or more signals from a sensor array for a robotic cleaner and comparing said received signals to one or more object detection threshold values;
   determining if said robotic cleaner was moving along a travel path for a predetermined period of time, window W;
   in response to said determination that said robotic cleaner was moving along said travel path straight-line motion during said window W, calculating a value of said received signals from said sensor array during a plurality of calibration periods C of said window W, wherein a sum of all said calibration periods C during window W is less than a length of said window W; and
   adjusting one or more of said object detection threshold values based on said calculated value during said window W.

22. The one or more non-transitory computer readable memories of claim 21, wherein in response to a determination that said robotic cleaner was not moving along said travel path during said window W, said operations further comprise using one or more current object detection threshold values.

23. The one or more non-transitory computer readable memories of claim 21, wherein said calculating said value of said received signals from the sensor array during the plurality of calibration periods C of the window W comprises calculating said value based, at least in part, on an average of said received signals from said sensor array during the plurality of calibration periods C of said window W.

24. The one or more non-transitory computer readable memories of claim 21, determining said robotic cleaner was moving along said travel path during window W if said robotic cleaner does not detect a bump and does not initiate a turn.

25. The one or more non-transitory computer readable memories of claim 21, further comprising the operations of:
   determining whether said received signals from said sensor array meet or exceed one or more of said object detection thresholds for greater than or equal to a predetermined amount of time $T_{false}$; and
   in response to said determining that said received signals from said sensor array meet or exceed one or more of said object detection thresholds for greater than or equal to a predetermined amount of time $T_{false}$, causing said robotic cleaner to engage forward motion.

26. The one or more non-transitory computer readable memories of claim 25, wherein said determining whether said received signals from said sensor array meet or exceed one or more of said object detection thresholds for greater than or equal to said predetermined amount of time $T_{false}$ comprises determining whether said received signals from said sensor array meet or exceed a far object detection threshold for greater than or equal to said predetermined amount of time $T_{false}$.

27. The one or more non-transitory computer readable memories of claim 25, wherein engaging forward motion comprises one or more of:
   setting one or more of the object detection thresholds to a maximum value;
   setting one or more of the object detection thresholds to an elevated value;
   disable one or more of the object detection thresholds; and/or
   ignoring one or more of the object detection thresholds.

28. The one or more non-transitory computer readable memories of claim 21, wherein at least one of said calibration periods C starts at a beginning of said window W.

29. The one or more non-transitory computer readable memories of claim 21, wherein said travel path comprises substantially linear movement.

30. The one or more non-transitory computer readable memories of claim 21, wherein said travel path comprises a curvilinear movement.

* * * * *